United States Patent [19]
Hanks et al.

[11] 3,760,916
[45] Sept. 25, 1973

[54] SINGLE POSITION FLUID OPERATED CLUTCH

[75] Inventors: James V. Hanks; Eugene L. Dahl, both of Minneapolis, Minn.

[73] Assignee: Horton Manufacturing Company, Inc., Minneapolis, Minn.

[22] Filed: Apr. 7, 1972

[21] Appl. No.: 242,105

[52] U.S. Cl. .......................... 192/67 R, 192/85 CA
[51] Int. Cl. ..................... F16d 11/10, F16d 25/061
[58] Field of Search ............. 192/67 R, 67 P, 85 CA

[56] References Cited
UNITED STATES PATENTS

| | | | |
|---|---|---|---|
| 2,919,775 | 1/1960 | Wiedmann et al. | 192/67 R X |
| 2,757,768 | 8/1956 | Landerer | 192/67 R X |
| 1,163,415 | 12/1915 | Kling | 192/67 R |
| 1,584,104 | 5/1926 | Lentaty | 192/67 R |
| 2,366,461 | 1/1945 | Shoreys | 192/67 R X |
| 2,384,418 | 9/1945 | Edmondson | 192/67 R |
| 2,738,210 | 3/1956 | Hjembo | 192/67 R X |

Primary Examiner—Allan D. Herrmann
Attorney—Jack W. Wicks et al.

[57] ABSTRACT

The disclosure relates to a clutch having coaxial driving and driven members including a hub for mounting on a driven shaft with a drive member slidably mounted on the hub and rotatable thereby, the drive member formed with a multiplicity of ball-receiving cavities, a carrier member having a multiplicity of balls mounted thereon for engagement with the cavities, the carrier and drive members having intermeshing teeth, means for carrying the ball carrier rotatable on the hub, and means for urging the drive member axially on the hub for engagement of the cavities thereof with the balls of the carrier as the teeth of the drive member engage the teeth of the ball carrier to thereby rotate the means carrying the ball carrier.

8 Claims, 12 Drawing Figures

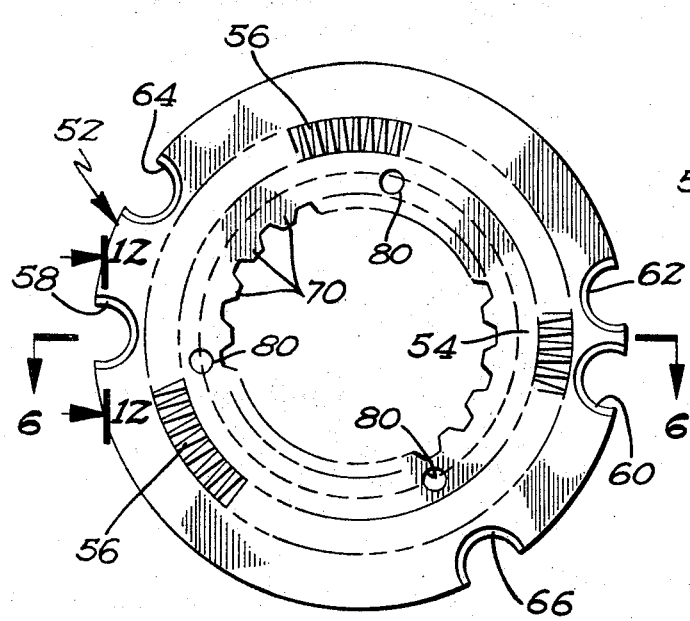
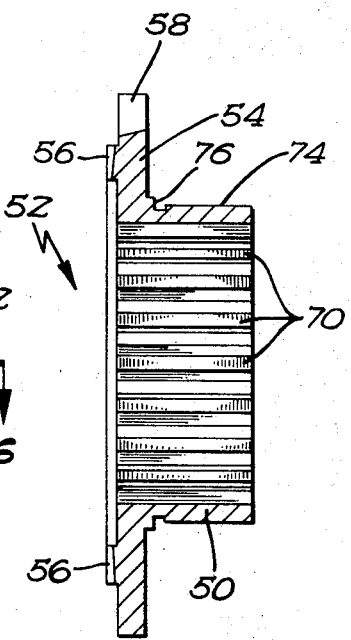
Fig 5   Fig 6
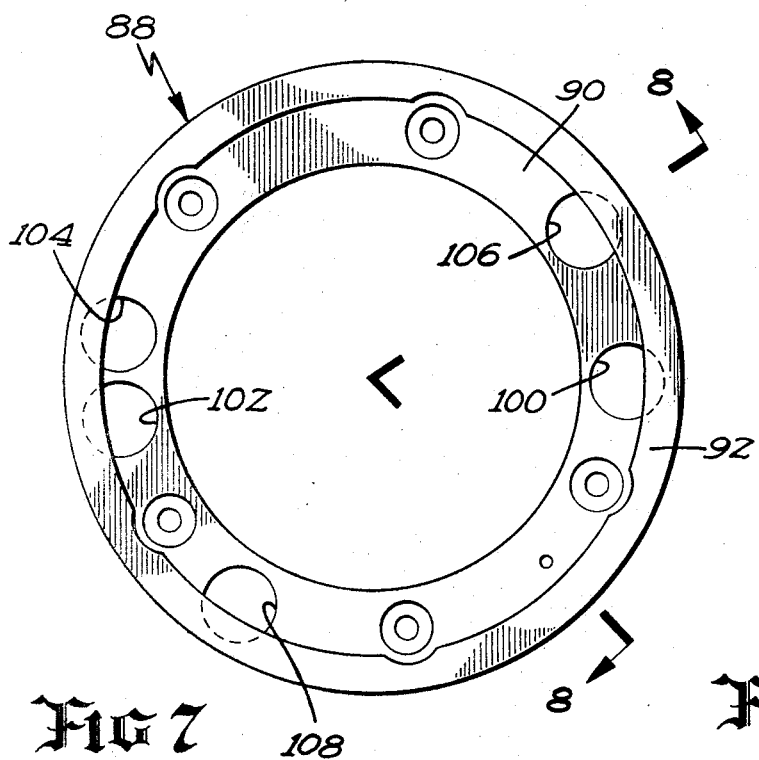
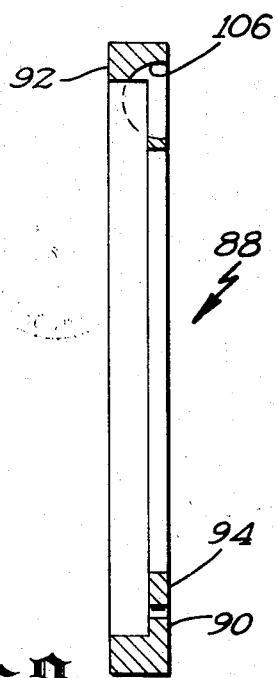
Fig 7   Fig 8

SINGLE POSITION FLUID OPERATED CLUTCH

SUMMARY

This invention relates to an improvement in clutches and more particularly to a clutch engageable in a single driving position with which the input and output always come to the same degree of registry for rotation of the output.

The present device includes a ball carrier on the output side of the device the balls of which keep the face of the input drive ring perpendicular to the sliding axis of the hub which provides lateral support between the drive ring and the ball carrier. The balls prevent a torque output during the seeking of registry of the balls of the ball carrier with the cavities of the device ring. With registry the teeth of the drive ring engage teeth of this ball carrier output member.

In the printing industry where sheet material must be put through a run a second time and register with a previous sheet position the subject clutch allows a declutched element to be clutched in to the same previous position relative to a member of the machine running the sheet material. With the present invention the clutching is accomplished with positive torque transfer and the desired lateral support within the unit.

In the drawings forming part of this application:

FIG. 5 is a plan view of the drive ring.

FIG. 6 is a sectional view through the drive ring.

FIG. 7 is a plan view of the ball carrier ring.

FIG. 8 is a sectional view through the ball carrier ring.

Figure 1:
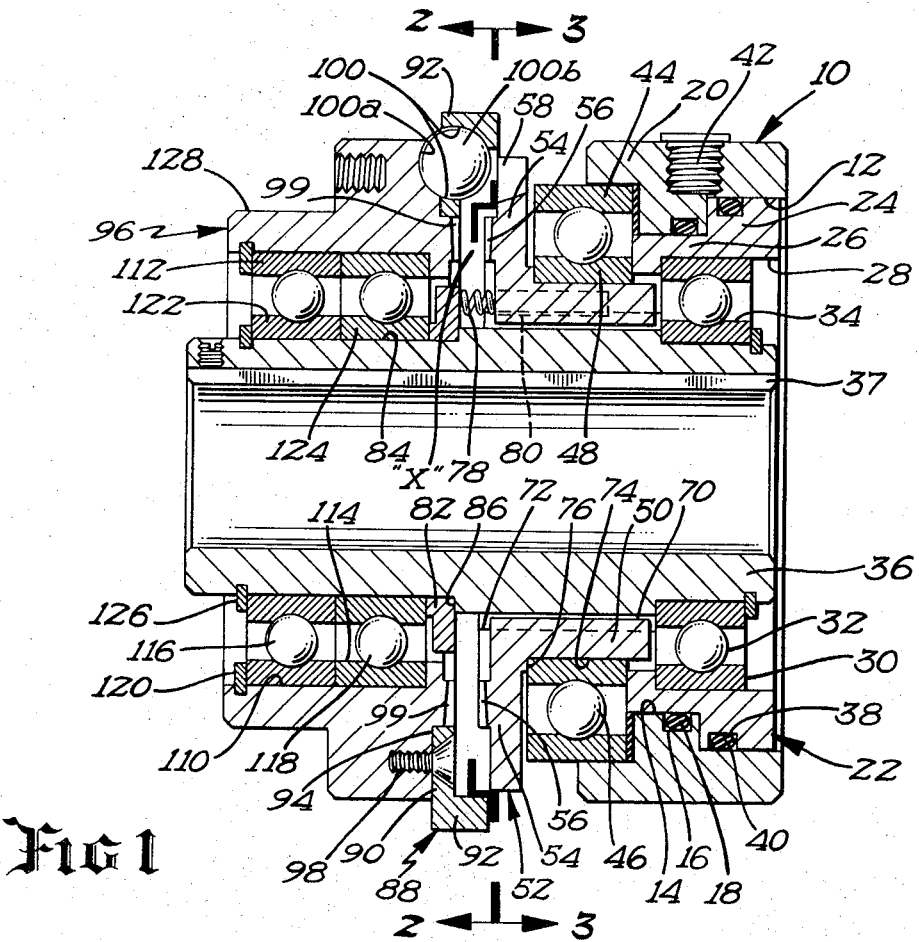
FIG. 1 is an axial section through the one-position clutch embodying the invention.
Figure 2:
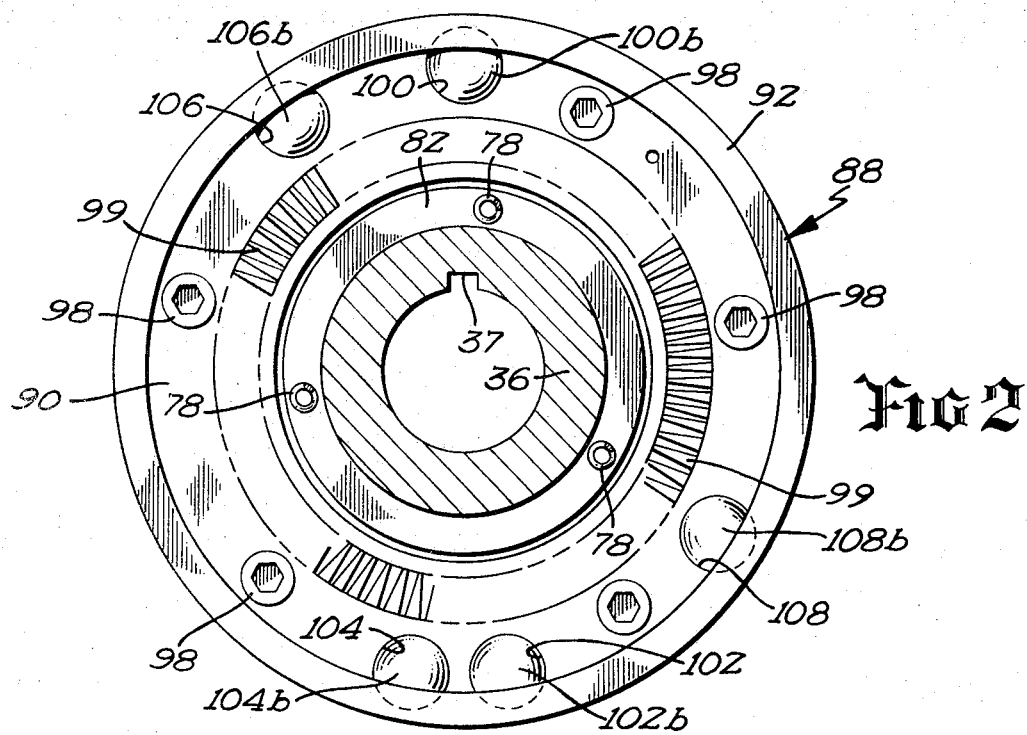
FIG. 2 is a sectional view on the line 2—2 of FIG. 1.
Figure 3:
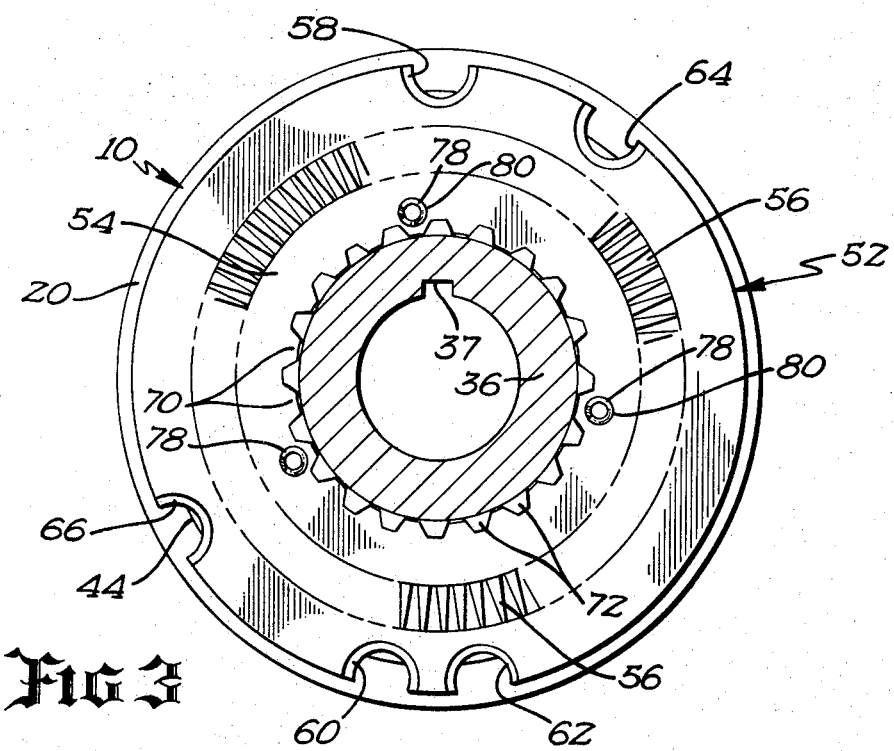
FIG. 3 is a sectional view on the line 3—3 of FIG. 1.

Referring to the drawings in detail, the clutch A includes the stationary cylinder 10 formed with the internal annular surface 12 and the reduced diameter annular surface 14. Formed in the cylinder surface 14 is the annular recess 16 in which is positioned the O-ring 18. The cylinder 10 also includes the annular flange 20. Further provided is the annular piston 22 formed with the major diameter portion 24 and the reduced diameter portion 26. The piston 24 is formed with the annular recess 28 in which is press fit the outer race 30 of the bearing 32. The inner race 34 of the bearing 32 is press fit on the rotatable hub 36 formed with the internal keyway 37. The outer surface of the piston portion 24 is formed with the annular recess 38 in which is positioned the O-ring 40 which makes sealing engagement with the cylinder 10. The O-ring 18 makes sealing engagement with the piston portion 26.

The numeral 42 designates an inlet which allows fluid pressure to enter the cylinder by conventional means. The outer race 44 of bearing 46 is mounted within the cylinder flange 20 and the inner race 48 is press fit upon the splined sleeve 50 of the circular drive ring 52. The sleeve 50 terminates in the radially disposed annular flange 54 on the face of which is formed the annular ring of teeth 56. Formed at the periphery of the annular flange 56 are the five spaced ball-receiving cavities 58, 60, 62, 64, and 66.

The flange of the drive ring 52 is formed with a central opening 68 which coincides with the inner surface of the sleeve 50, and formed on the inner surface of the flange and the sleeve are the splines 70 which slidably engage with the splines 72 formed on the hub 36 thereby allowing the drive ring to slide axially on the hub. The inner race 48 of the bearing 46 is press fit in the annular recess 74 of the sleeve 50 of the drive ring and the race 48 abuts the shoulder 76 of the drive ring formed by the recess 74. Thus as the cylinder 10 is moved axially on the piston 22 the cylinder moves the bearing 46 axially which in turn carries with it the drive ring 52 slidably splined upon the hub 36 as described.

The drive ring 52 is urged against axial movement by means of a multiplicity of coil spring 78 mounted in bores 80 formed in the sleeve 50, the outer ends of the springs abutting the back up washer 82 mounted on the hub 36 and the inner ends of the springs abutting the inner ends of the bores 80. The washer 82 is mounted in the recess 84 formed on the hub and abuts the shoulder 86 formed by the recess 84.

Figure 4:
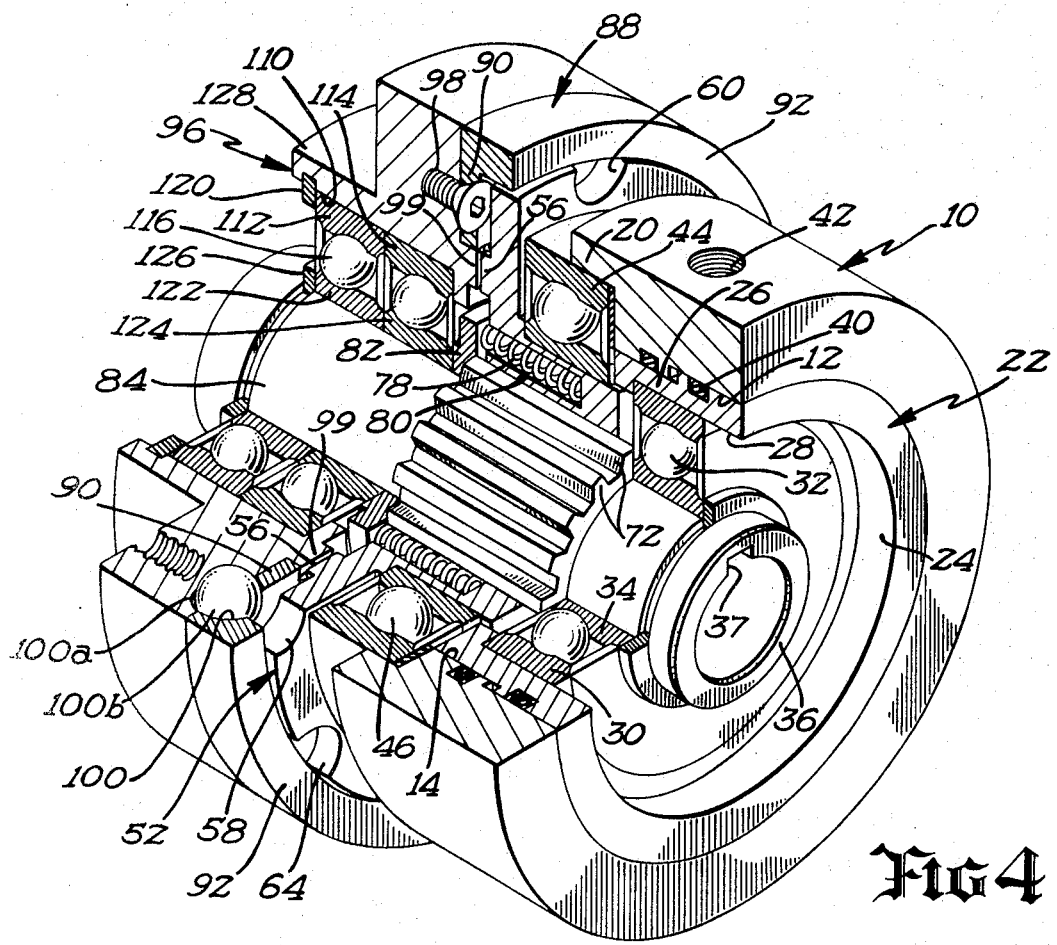
FIG. 4 is a perspective view of the clutch with portions thereof broken away.

The numeral 88 designates a ball carrier ring formed of the flat radially disposed ring portion 90 terminating in its outer edge in the right angular annular outer flange 92. The ball carrier ring is secured in a recess 94 formed in the annular flange mount 96 by means of the bolts 98. Formed on the inner face of the mount 96 are the teeth 99 which are in axial alignment with and engageable with the teeth 56 of the drive ring 52. The ball carrier ring 88 has formed in the ring portion 90 and the flange 92 thereof the partial ball sockets 100, 102, 104, 106, and 108 which are in alignment with the ball cavities 58, 60, 62, 64, and 66 of the drive ring, respectively. The partial ball sockets also include the complementary partial socket portions such as 100a, particularly FIGS. 1 and 4 with four identical partial socket formations formed in the flange mount 96, all in axial and radial alignment with the partial sockets 100–108. The balls 100b, 102b, 104b, 106b, and 108b are mounted on the flange mount 96 by placing the balls first in the partial sockets 100–108. Next the combination and the balls thereof are placed in the partial complementary socket portions 100a–108a and the ring 88 secured to the mount 96 thereby mounting the balls on the mount 96. The mount 96 has formed therein the annular recess 110 in which the outer races 112 and 114 of the bearings 116 and 118, respectively, are press fit and held therein by the lock ring 120. The inner races 122 and 124 are press fit in the recess 84 and abutting the washer 82 and held in position by the lock ring 126. The flange mount 96 has formed therein the annular recess 128 on which a sheave may be mounted for driving of the same.

The hub 36 is keyed to the shaft of a motor not shown whereby the drive ring 52 is rotated. Fluid pressure is introduced into the inlet 42 thereby causing the cylinder 10 to move axially and cause the drive ring 52 to also move axially as it rotates whereby the cavities 58–66 seek register with the balls 100b–108b. Generally speaking, with register of the cavities with the balls, the teeth 56 of the drive ring engage the teeth 99 of the mount 96 whereby the flange mount is rotated. Torque force is not created until full registry of the balls and teeth and once there is engagement all torque is taken by the teeth engagement and not the balls. It will be seen that all five balls are either in or out of engagement and when not in engagement there is planar support for the drive ring. It will be further seen that with the positioning of the balls as set forth herein there are always three balls in a triangle containing the axis of the clutch with engagement of portions of the member between the cavities along the path to support the drive ring before engagement of the teeth 56 with teeth 99 and there is negligible torque output during the seeking of the balls by the cavities.

DETAILS OF THE DRIVE RING AND BALL CARRIER

The cavities 58, 60, 62, 64, and 66 lie at the compact angles plus or minus 10° as long as the balls do not extend past the 20° envelope about the compact angle, i.e. 10° on either side. The cavities are positioned as follows. With cavity 58 as a 0° reference and proceeding, cavity 60 is 170° on a circle removed from cacity 58, cavity 62 is 190° removed from cavity 58, cavity 64 is 40° removed from cavity 58, cavity 66 is 250° on the circle, the degrees of relationship shown in particular in FIGS. 5 and 10. The position of the balls in the ball carrier is identical.

It has been found that for a single position ball clutch to function properly, and with a minimal volume, that a minimum of five balls operating at the same radius are needed. It has also been found, for example, that three balls describing a plane about the center axis and operating in concentric but different orbits is not the solution for a minimal volume radially although the unit may be properly supported at all times. However, such an example requires large balls and relatively large radius operating orbits in order to attain tooth engagement of the drive ring and the ball carrier ring whereby compactness is lost.

With compactness necessary, it is desirable to utilize balls as small as feasible and operate them in a single orbit and with such construction all the balls pass over all the cavities while seeking registry therewith. In order to properly support the cavity and teeth carrying drive ring 52 during the seek to registry, it has been found that a sufficient number of balls be used and spaced so that when a ball passes over a non-registry cavity the remaining balls describe a stable plane about the axis of the clutch unit. Such is described herein.

Figure 12:
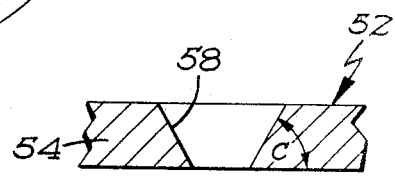
FIG. 12 is a sectional view on the line 12—12 of FIG. 5.

With the minimum of five balls operating at the same radius it has been further found there are three minimum spatial relationships that must hold:

1. The optimal angular configurations of the balls, for a radially compact unit, operating at the minimum orbital radius is 0°, 40°, 170°, 190° and 250° as heretofore set forth, FIG. 10.
2. The minimum tooth clearance for a ball of a given radius, $r$, and a tooth form with a root angle of, $b$, is given as tooth clearance $= r[1 - \sin(90° - b)]$, FIG. 11.
3. The cavity angle, $c$, is bounded between the tooth root angle, $b$, and 90°, i.e. $b < c < 90°$, FIG. 12.

Figure 9:
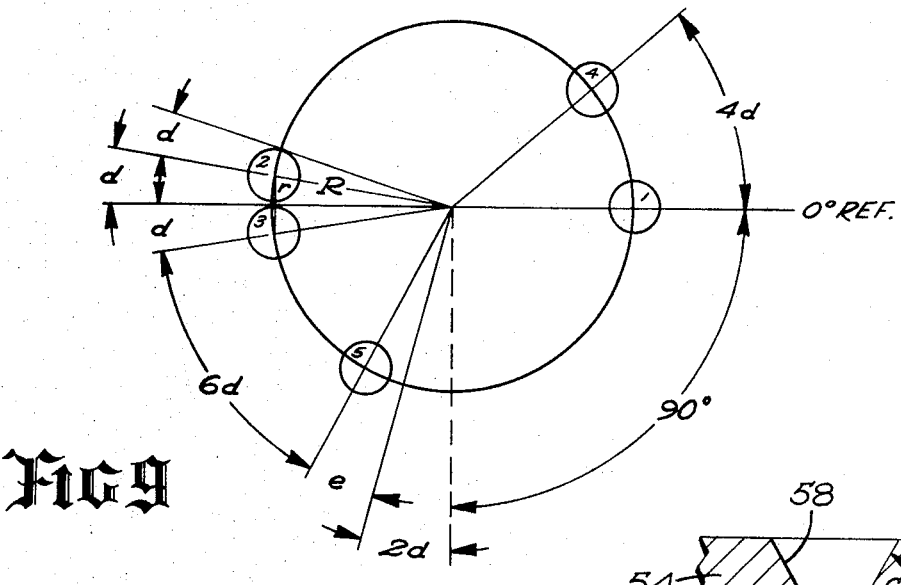
FIG. 9 is a diagrammatic illustration of the angular geometry of the ball positions.

It has been found that five balls yield proper support when properly spaced. The spacing of the five balls is a function of the radius of the operating orbit of the balls and the diameter of the balls. The optimal angle is first established by means of placing the balls at the compact operating radius. Once these optimal angles are determined then these angles are utilized for all radii greater than the compact radius. This function for a radially compact unit with five balls is determined as follows and in connection see FIG. 9.

Figure 10:
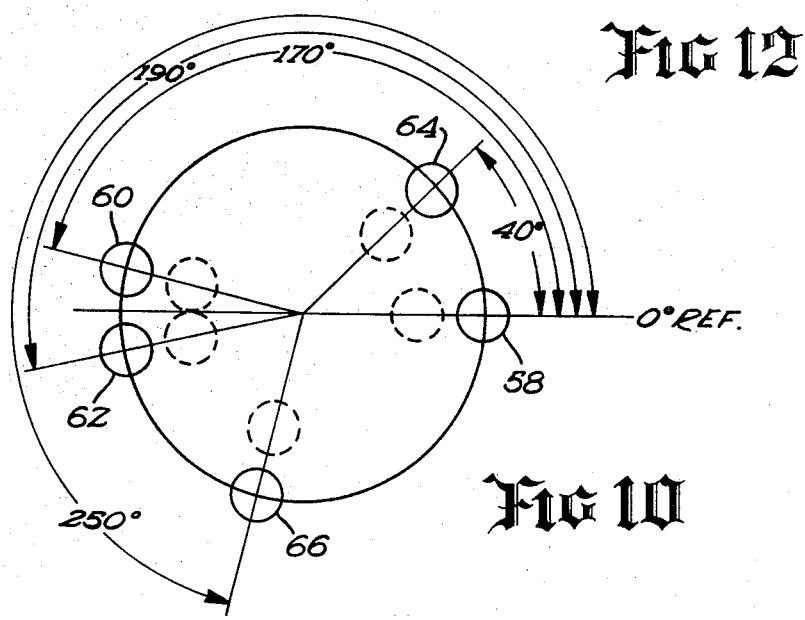
FIG. 10 is a diagrammatic illustration of the compact angles, the balls at the most compact radius shown in broken lines.

1. Place one ball at the 0° reference.
2. Place the next two balls No. 2 and No. 3 in contact at $180° \pm d$. Where $d = \sin r/R$.
3. The fourth ball is placed so the second and third ball may be supported between the first and fourth cavity holes. This requires, $4d$ for full diameter cavity holes.
4. Likewise, the first and fourth balls must be supported between the third and fifth cavities which requires an angle of $6d$.
5. The 90° angle is denied as possible position of the fifth ball because d is small and loss of support would result due to the approximate symmetry. This is completely denied by disallowing the positioning of the fifth within one ball diameter or $2\,d$ away from the 90° position. This leave an unrestricted position angle where the fifth ball may lie called $e$.
6. From FIG. 9, $9d + e = 90°$. With a radially compact unit desired, $e$ is set at 0, and therefore $9d = 90°$ or $d + 10°$. The angular position of the balls then follow directly as shown in FIG. 10.

Since $d = 10° = \sin r/R$, then
$R = r/\sin 10° = r/0.1736$
defines the minimum radius of the operating orbit for a given ball radius (i.e. for ½ inch balls, the 1.44 is the minimum radius of the operating orbit). This does not imply that different angles at larger radii of operating orbits could not be used but other angles do not yield optimal support as do the compact angles. The compact angles work for all radii of the operating orbits greater than the aforementioned minimum.

The tooth clearance as at "X", FIG. 1, is the distance between the drive teeth while the clutch is seeking registry and the tooth clearance is a function of the ball size and the tooth form. This function can be determined by considering the physical constraints of a ball rolling about its point of contact with a corner (i.e. the ball rolling or sliding into the ball cavity).

1. Since the ball is constrained in the ball carrier, the engaging teeth will trace out the same path as that of the center of the ball regardless of their relative plane along the axis of the unit.
2. The ball acts as a rigid constraint, and it has been found that the teeth must engage on the incoming side if both the balls and teeth are to become fully engaged.
3. It has also been found that the teeth must be carried over the crown of the matching set of teeth in order to contact the incoming side only.
4. The amount of travel needed after the teeth have been carried over the crown is not related to the ball size or tooth clearance.

Figure 11:
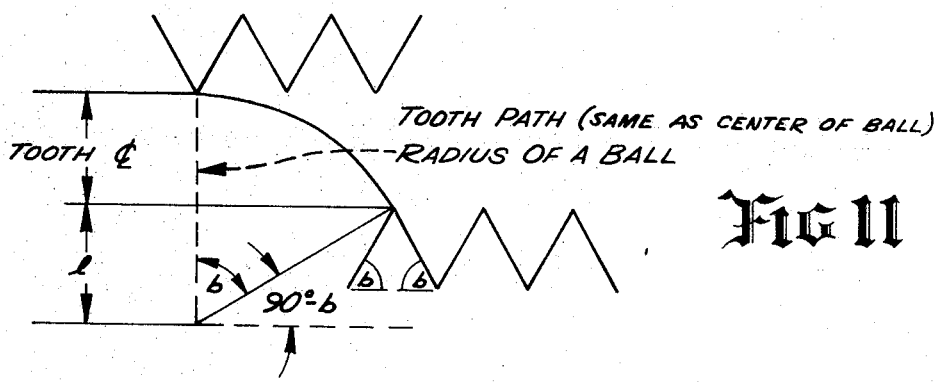
FIG. 11 is a diagrammatic illustration of the tooth path during the process of engagement.

From these constraints, the minimum tooth clearance is determined as follows, see FIG. 11.

1. The teeth are just carried over the crown of the matching teeth.
2. The angle of incidence of the path of the teeth with its matching set at contact is zero.

3. It is seen that $1 = r \sin (90°-b)$ and that the minimum tooth clearance for a single intercept is:

tooth clearance $= r - 1$
$= r - r\sin (90°-b)$
$= r [1 - \sin (90° - b)]$

For example, if the ball diameter is ½ inch and the tooth root angle is 60°, the minimum tooth clearance is:

tooth clearance $= ¼ [1 - \sin (90° - 60°)]$
$= ¼ [1 - ½]$
$= ⅛$ inch

See FIG. 5.

The form of the ball cavities is restricted physically by the tooth root angle and the necessity of disengagement under load. If the cavity angle is less than the tooth root angle, then the teeth will never fully engage. If the cavity angles is greater than 90°, then the ball will lock in under torque if the center of the ball drops below the cavity surface when engaged. Practically then an angle great enough to ensure full engagement of the teeth and yet still have good disengagement characteristics is selected either by judgement or empirically. It has been found that 70° yields acceptable performance for ½ inch balls and 60° teeth.

We claim:

1. A one position clutch comprising:
   a. a hub for mounting a driven shaft,
   b. a drive ring slidably mounted on said hub and rotatable thereby,
   c. said drive ring formed with a multiplicity of projection-receiving tapered cavities,
   d. a projection carrier ring having a multiplicity of projections mounted thereon adjacent the periphery thereof for engagement with said cavities of said drive ring,
   e. said drive ring having teeth formed thereon and radially within said projection-receiving cavities,
   f. said projection carrier ring having teeth formed thereon radially within said projections for engagement with the teeth of said drive ring,
   g. a flange mount carrying said projection carrier ring rotatable on said hub,
   h. means for urging said drive ring axially on said hub for engagement of said cavities thereof with said projections of said carrier ring as said teeth of said drive ring engage the teeth of said projection carrier ring to thereby rotate said flange mount carrying said projection carrier ring.

2. The clutch according to claim 1 in which
   a. the projections and cavities are arranged so that in one position the projections overlie the cavities for registry and in any other position at least three projections form a triangle containing the axis of the clutch and engage portions of the member between the cavities and along said path.

3. A one-position clutch comprising:
   a. a hub for mounting a driven shaft,
   b. a drive ring slidably mounted on said hub and rotatable thereby,
   c. said drive ring formed with a multiplicity of ball-receiving tapered cavities on the periphery thereof,
   d. a ball carrier member in the form of a ring and having a multiplicity of balls mounted adjacent the periphery thereof for engagement with said cavities of said drive ring,
   e. said drive ring having teeth formed thereon and radially inwardly of said ball-receiving cavities,
   f. said ball carrier ring having teeth formed thereon and radially inwardly of said balls for engagement with the teeth of said drive ring,
   g. a flange mount carrying said ball carrier ring rotatable on said hub,
   h. fluid pressure means for urging said drive ring axially on said hub for engagement of said cavities thereof with said balls of said carrier ring as said teeth of said drive ring engage the teeth of said ball carrier ring to thereby rotate said flange mount carrying said ball carrier ring.

4. The clutch according to claim 3 in which
   a. the balls and the cavities are arranged so that in one position the balls overlie the cavities for registry and in any other position at least three balls form a triangle containing the axis of the clutch and engage portions of the drive ring between the cavities of the drive ring.

5. The clutch according to claim 3 in which said means for urging said drive ring to said ball carrier ring includes
   a. a stationary annular cylinder in which said hub is rotatably mounted,
   b. an annular piston mounted within said cylinder, and
   c. fluid inlet means for actuating said piston into engagement with said drive ring to slidably move the same.

6. The clutch according to claim 3 in which
   a. the angles between a certain ball and its corresponding cavity and the successive balls and cavities are substantially 0°, 40°, 170°, 190°, and 250°.

7. The clutch according to claim 6 in which
   a. the teeth have intermeshing V-shaped ends.

8. The clutch according to claim 6 in which
   a. the balls and the cavities are arranged so that in one position the balls overlie the cavities for registry and in any other position at least three balls form a triangle containing the axis of the clutch and engage portions of the drive ring between the cavities of the drive ring.

* * * * *